June 25, 1940.   J. L. PHILLIPS   2,205,992

STORAGE BATTERY AND PROCESS OF ITS ASSEMBLY

Filed Feb. 18, 1937

WITNESS:

INVENTOR

Joseph L. Phillips
BY
Augustus B. Stoughton
ATTORNEY.

Patented June 25, 1940

2,205,992

UNITED STATES PATENT OFFICE 2,205,992

STORAGE BATTERY AND PROCESS OF ITS ASSEMBLY

Joseph L. Phillips, Philadelphia, Pa., assignor to The Electric Storage Battery Company, Philadelphia, Pa., a corporation of New Jersey Application February 18, 1937, Serial No. 126,316

2 Claims. (Cl. 136—81)

The object of my invention is to provide, in a storage battery, means for holding the plate group in the container against horizontal or vertical movement such as may be caused by the vibration of an automobile on which the battery is mounted.

For a further exposition of my invention, reference may be had to the annexed drawing and specification, at the end thereof my invention will be specifically pointed out and claimed.

Figure 1:
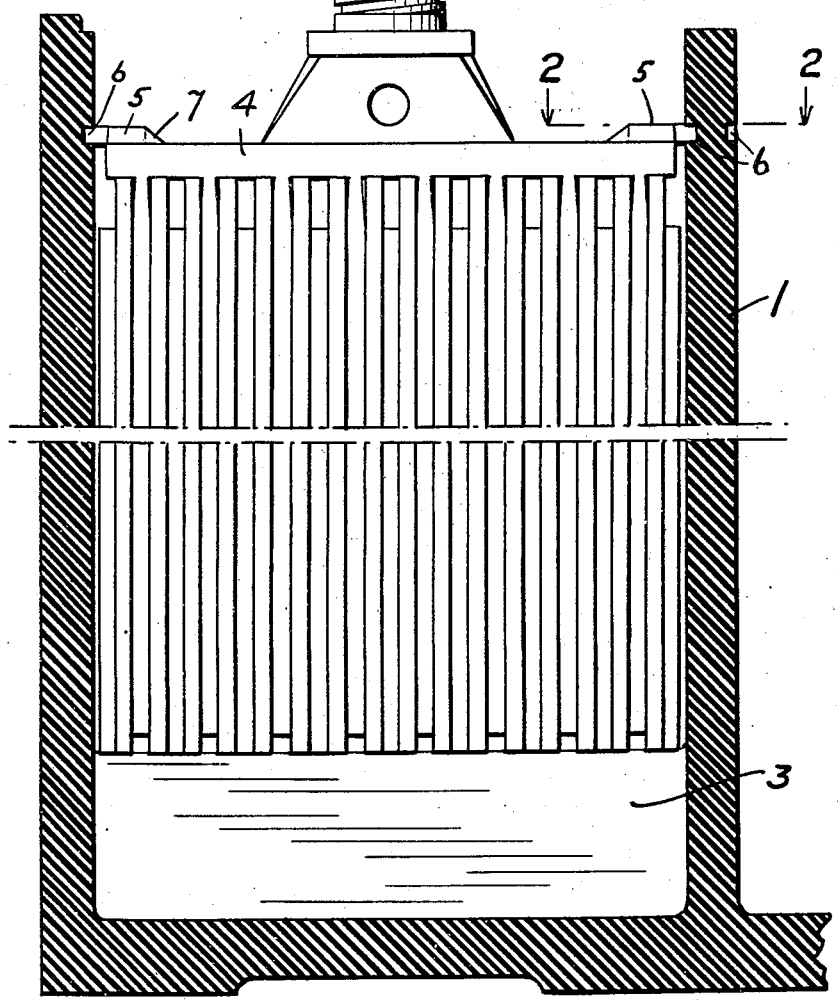
Fig. 1 shows an elevation in cross-section of a storage-cell during assembly embodying this invention.

That embodiment of my invention shown in the drawing and discussed in the specification is selected from among other embodiments which my invention may take.

In Fig. 1, 1 is the wall of a multi-compartment container for a storage battery, within which is assembled the usual group of positive and negative plates with separators between, the plates as here shown resting on horizontal ribs 3 in the bottom of the jar. The plates are assembled to the usual straps, one of which is shown at 4. In order to prevent the plate groups from shifting, especially in the vertical direction with vibration of the cell, such for example as may occur in an automobile, it is desirable to hold the elements in place against such vertical motion. By the present invention, this is accomplished by means of the hold-down pieces 5 attached to the upper surface of the strap 4 at its two ends and projecting beyond the ends of the strap into horizontal notches 6 molded or otherwise formed in the jar wall. The hold-down pieces 5 are placed in position after the group has been located in the cell and then attached to the upper surface of the strap by puddling molten lead 7 into the angle between the hold-down piece 5 and the upper surface of the strap. This puddling joint is carried across the end of the hold-down piece and along the two sides as far as the end of the strap to make a solid junction between the two.

Figure 2:
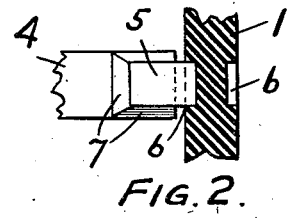
Fig. 2 shows a horizontal section on the line 2—2 of Fig. 1.

As shown in Fig. 2, the hold-down piece 5 fits snugly into the notch 6, horizontally as well as vertically, so that relative motion between the plate group and the jar is prevented in both directions.

I do not intend to be limited save as the scope of the prior art and of the attached claims may require.

1. In a storage battery having the ends of its plate structure strap located or extended into mortises in the opposite side walls of the cell, improved means for holding down the plate structure which consists in the combination of ribs at the bottom of the cell on which the plate structure rests and by which it is positioned vertically, mortises provided in the opposite side walls of the cell and arranged above the level of the top of the strap of the plate structure, and projecting members arranged on top of the strap and projecting into the mortises, said members being autogeneously attached to the ends of the strap and said ribs serving to position the plate structure properly in respect to the mortises to facilitate the autogeneous welding operation after the plate structure is assembled in the cell.

2. The improved method of assembling a storage battery plate structure having a strap and a multi-compartment container provided with upstanding ribs on its bottom and mortises in its side walls located above the ribs a distance exceeding the distance between the bottom of the plate structure and the top of its strap, which consists in mounting the plate structure on the ribs with its strap below the mortises, mounting hold-down pieces narrower than the strap on the upper surface of the strap and inserting their ends in the mortises and finally puddling lead into the angular space between the sides of the holddown pieces and the edges of the strap.

JOSEPH L. PHILLIPS.